Jan. 10, 1939.   B. G. CARLSON   2,143,140
ALTITUDE CONTROL FOR AIRCRAFT
Filed March 4, 1937   2 Sheets-Sheet 2
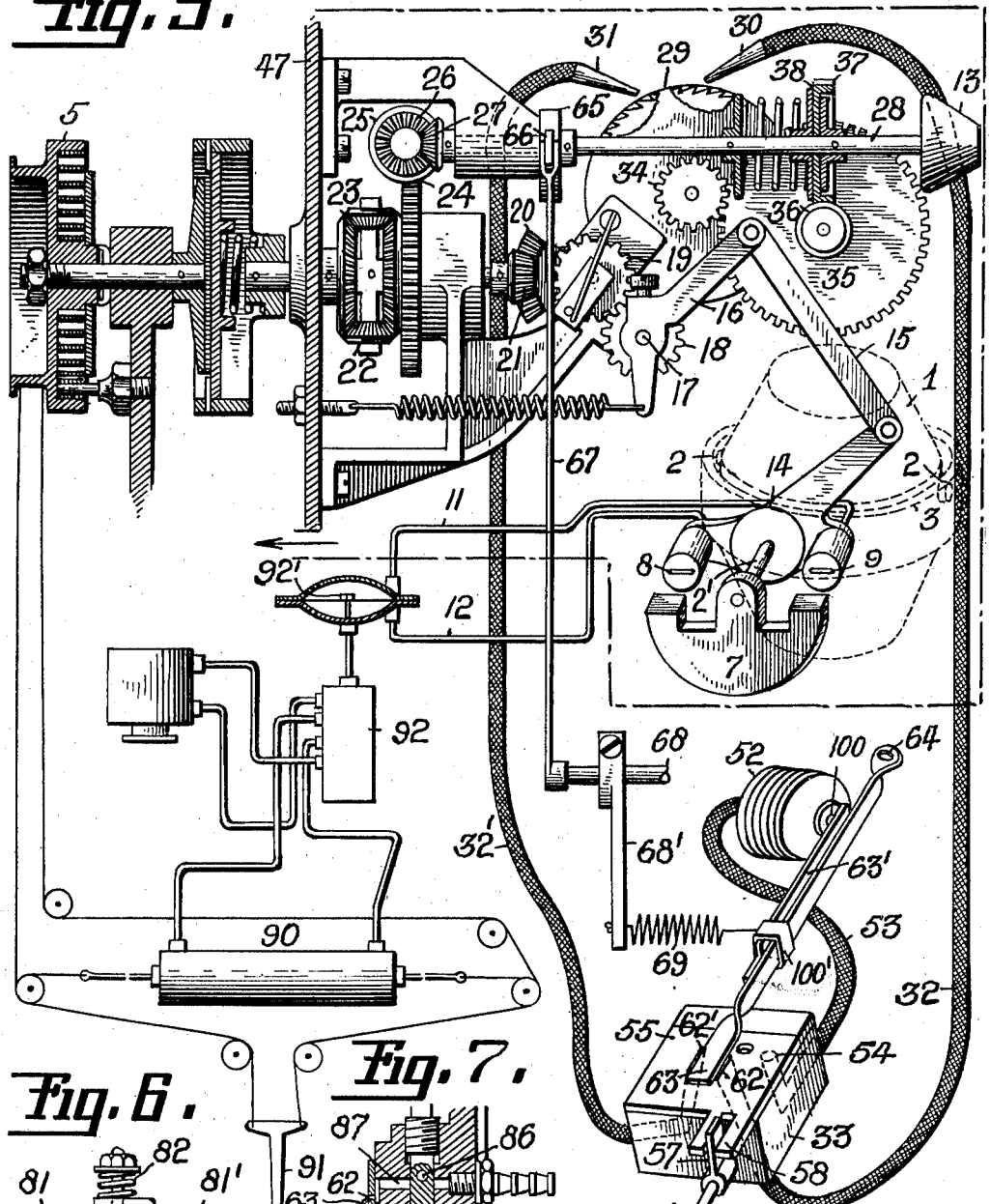
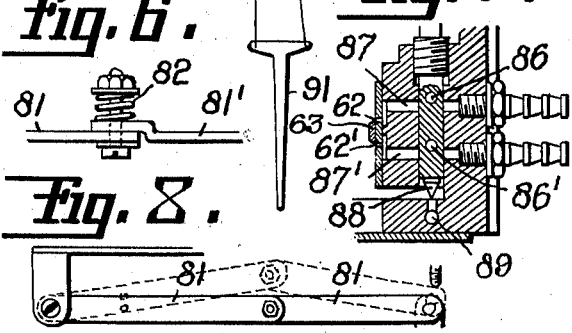
INVENTOR
Bert G. Carlson
BY
HIS ATTORNEY.

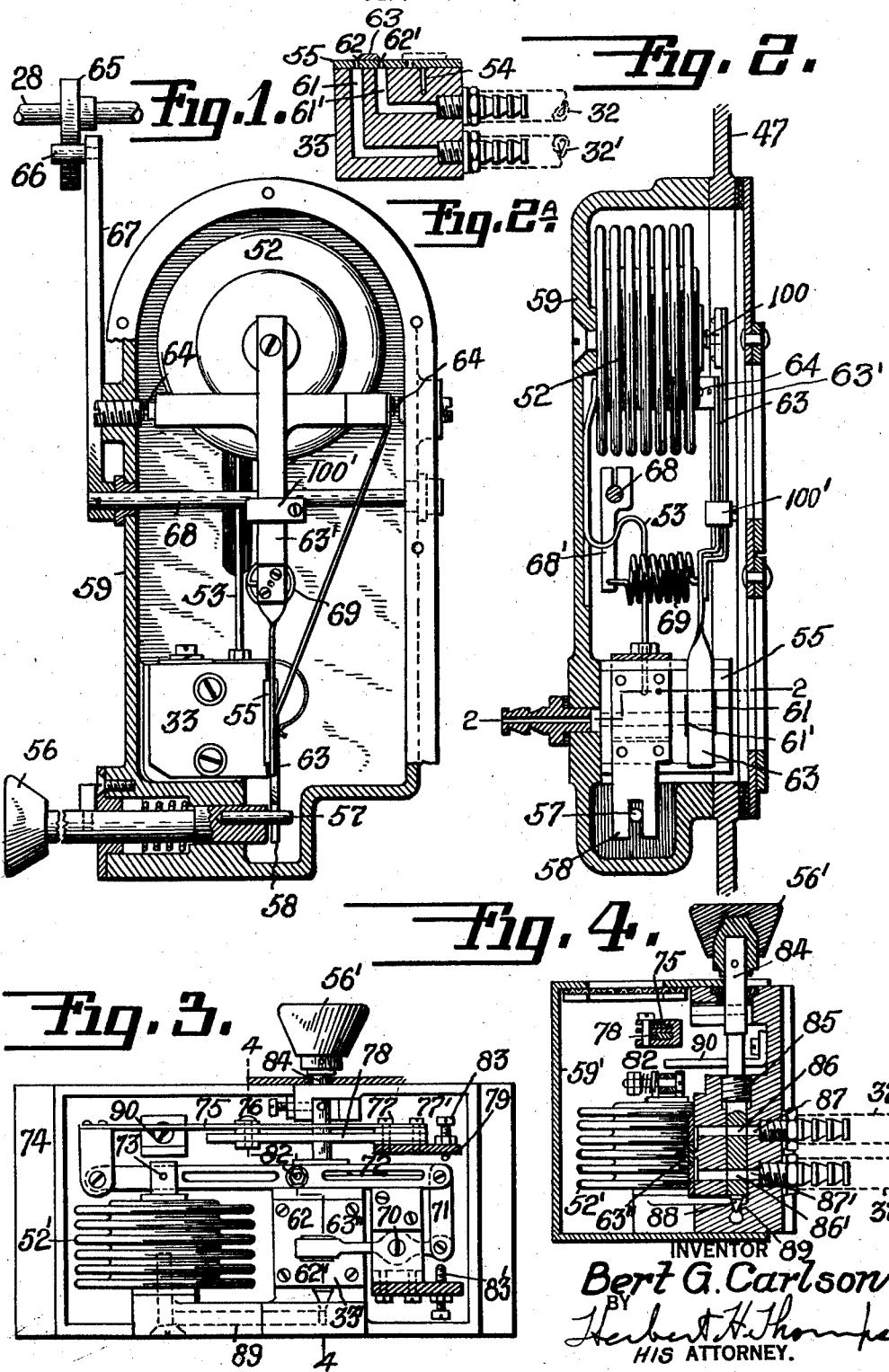

Patented Jan. 10, 1939

2,143,140

UNITED STATES PATENT OFFICE 2,143,140

ALTITUDE CONTROL FOR AIRCRAFT

Bert G. Carlson, Freeport, N. Y., assignor to Sperry Gyroscope Company, Inc., Brooklyn, N. Y., a corporation of New York Application March 4, 1937, Serial No. 128,946

7 Claims. (Cl. 244—78)

This invention relates to the control of altitude in automatic pilots for aircraft for causing the craft to fly at a predetermined altitude. More particularly, my invention constitutes an improvement in the altitude control shown in the prior joint application of applicant and Theodore W. Kenyon, Serial No. 107,152, filed October 23, 1936, for Hydraulic automatic pilots.

One of my improvements over the prior application consists in compensating the barometric control for temperature changes, so that changes in temperature will not affect the altitude setting.

Another important improvement consists in providing a simpler means for preventing hunting of the craft in elevation than shown in the aforesaid prior application, and which does not involve any follow-back connection between the barometer and the controlled part on the gyroscope.

Further advantages of the invention will appear from the following description.

In the drawings, showing several forms my invention may assume,

Fig. 1 is a plan view, partly in section, of one form of barometric control, with the cover removed.

Fig. 2 is a vertical section through the same.

Fig. 2—A is a transverse section through the control box, taken approximately on broken line 2—2 of Fig. 2.

Fig. 3 is a plan view, with cover removed, of a modified and preferred form of barometric device.

Fig. 4 is a section of the same, taken on broken line 4—4 of Fig. 3.

Fig. 5 is a view of the interior of a portion of the control box of the automatic pilot, partly in section and partly in diagram form, and also showing diagrammatically the servo motor rudder control operated therefrom.

Fig. 6 is a detail of the jointed actuating lever of Fig. 3.

Fig. 7 is a detail view showing the shut-off valve of Fig. 4 in the shut-off position.

Fig. 8 is a detailed side view of the jointed lever, showing the same in two positions.

My invention is shown as applied to an automatic pilot of the general type shown in prior Patent #1,992,970, dated March 5, 1935, to E. A. Sperry, Jr., M. F. Bates and Bert G. Carlson, applicant herein. In such gyro pilots, a form of gyro pendulum or base line I is usually used as the base for controlling the attitude of the plane fore and aft and laterally, the gyroscope being mounted for oscillation about a fore and aft axis 2 within a gimbal ring 3 which, in turn, is mounted for oscillation about a transverse axis 2'. The ailerons and elevators are controlled through some delicate controls about the two axes of the gyroscope, such as air pick-off devices, and the follow-up connection from the elevator is brought back to the apparatus through the follow-up pulley 5. It is the present practice to enclose the gyroscope and control parts in a closed casing 41, from which air is continuously exhausted, as represented by the arrow.

The air pick-off means for elevator control may comprise a semicircular cut-off disc 7 (Fig. 5) secured to move with the gyroscope, and a pair of ports 8 and 9 pivoted on the aircraft on the transverse axis 2' of the gyroscope. The differential pressure drop in the pipes 11 and 12 leading to said ports is used to actuate the main servo motor 90' and elevator 91 through suitable diaphragm 92' and relay valve 92. Normally, the position of said ports about axis 2' is governed from the follow-up pulley 5 and also by whatever hand adjustment 13 is provided on the pilot. I prefer also to bring in the barometric control differentially through these same connections so that the changes of elevation are made through the gyroscope.

As shown in Fig. 5, the bracket 14 supporting the ports 8 and 9 is adjusted about the axis 2' by means of a link 15 pivoted to an arm 16 which is secured to the shaft 17 of pinion 18, rotated from a second pinion 19. On the shaft of the latter is a short bevel gear sector 20 rotated from a bevel gear 21, turned from planetary arm 22 of a differential 23. One side of said differential is shown as turned from the follow-up pulley 5, while the other side is shown as turned from a worm gear 24 driven from a worm 25 on the shaft of bevel pinion 26, the latter driven from a bevel pinion 27 on a long shaft 28. Said shaft may be turned directly from the thumb piece 13 to cause the craft to climb or dive, but I also preferably connect the said shaft to a small motor controlled from the barometric means. Said motor is shown as a small, light, reversible air turbine 29 driven in either direction from air nozzles 30 and 31, connected to pipes 32 and 32' leading to the barometric means 52. Said turbine is shown as comprising a pair of oppositely facing blade rotors, one for each nozzle. The turbine is connected through reduction gearing 34 and 35 to drive a worm 36 (Fig. 5), turning a small worm wheel 37 loosely mounted on the shaft 28. A friction clutch 38 is preferably provided to couple said worm gear to the shaft so that the thumb piece 13 may be turned without turning the air motor and its reduction gearing.

The barometric control proper preferably consists of a flexible container 52 of the type employed in aneroid barometers, but which in this case has a pipe connection 53 which may be opened or closed to the atmosphere at will. As shown, said pipe connection connects with a port 54 in the control box 33, which may be either opened or closed to the atmosphere by the lateral movement of a slidable cover plate 55, the position of which may be controlled from a thumb piece 56. On the shaft of said thumb piece is shown a lug or pin 57 engaging a fork 58 in an extension from the top plate.

The nozzles 30, 31 which operate the servo motor 29 are mounted within the casing 47, from which air is being continuously withdrawn. The barometric means, however, is preferably enclosed in a separate casing 59 which is cut off from the main casing 47 and is open at the top to the atmosphere. The block 33 is shown as having two ports 61, 61' therein, connected respectively to pipes 32 and 32', and these ports are normally in line with the small slotted openings 62, 62' in the top plate 55 so that, in operation, air is drawn in through said ports and issues from the nozzles 30, 31. As long as the pressure at both nozzles is equal, the turbine will stand still, but a pressure differential is controlled by a shutter 63 pivoted on axis 64, the movement of which is governed by the expansion and contraction of the barometric container 52.

The shutter 63 is preferably compensated against temperature changes. For this purpose there is shown a bi-metallic strip 63' placed between the shutter and the barometer, said strip having a small knob 100 on the under surface resting on the expansible container 52. Said strip is clamped at 100' near its other end to the shutter 63 and is designed so that the bending of the outer end of said strip is in the opposite direction to the expansion of the container 52 due to temperature changes.

In order to prevent hunting of the aircraft in elevation, I have shown a means for causing the ascent (or descent) to cease at the time, or a little before, the craft reaches its predetermined flight level. One method of accomplishing this is by means of a follow-back connection from the turbine 29 to the barometric means. This is preferably in the form of a cam 65 shown as mounted on shaft 28 turned from the turbine, against which bears a roller 66 on a lever 67, pinned to cross shaft 68 in casing 59. Also secured to shaft 68 is an arm 68' which is connected by means of a spring 69 to the shutter 63 so that the tension of the spring, and thereby the loading of the flexible container 52, is varied as the turbine 29 revolves one way or the other. This means has been found to be very effective in maintaining uniformly level flight and preventing hunting.

With the plate 55 positioned as shown in Fig. 2—A, the barometric means is in operation, the port 55 being at that time closed so that the barometer is sealed. If it is desired to change the altitude or throw out the automatic means, the handle 56 is merely moved clockwise in Fig. 5, thus moving plate 55 to the right, shutting off the air supply to the nozzles 30, 31 and connecting the pipe 53, and therefore the interior of container 52, to the atmosphere. By this means the barometer can be designed to be sensitive to small changes of altitude, since its range may be made limited.

In the preferred form of barometric control shown in Figs. 3, 4 and 6 to 8, the shutter 63" is shown as in the form of a link pivoted at 70 with its inner end partially overlying the ports 62 and 62' in the control block 33'. Link 63" is shown as actuated through a link 71 from a lever 72 pivoted at 73 on top of the barometric container 52'. Said lever is shown as pivoted at its left hand end to a bracket 74 secured to a thermostatic bi-metallic strip 75 which is clamped at spaced points 76, 77 and 77' to a relatively heavy strip 78, both strips being fastened by screws 77, 77' to fixed bracket 79. It will readily be seen, therefore, that the up and down movement of the left hand end of strip 75 will impart a slight motion to the lever 72 and thereby compensate for temperature changes. 90 is a stop bracket to limit the expansion of the barometer.

Preferably, also, the lever 72 is jointed in the middle to form two links 81 and 81', held together frictionally at their adjacent inner ends by spring clamp 82. Slightly above the right hand end of the link 81 I position an adjustable stop 83 and also a second stop 83' below the right hand end of the shutter 63" so as to limit the movement of the shutter in both directions. This construction also has the important advantage of preventing hunting of the craft in elevation, that is, continuous ascent and descent of the craft through a limited range, without the employment of a follow-up device such as shown in Figs. 1, 2 and 5. When the bellows 52 expands on ascent of the craft, the stop 83 is struck by the right hand end of the jointed lever 72. If the bellows continues to expand, the jointed lever will "break" in the middle, as shown in dotted lines in Fig. 8 in exaggerated form, so that the shutter is not moved any further. When, on the other hand, the proper altitude has been reached or slightly exceeded, the lever 72 will start to move downwardly in Fig. 8 with the joint still broken. This will result in the shutter 63" being moved back to a position to partially close the upper port 62 before said port would have been closed if the lever 72 had not been of this special construction, because the return movement is less, so that the ascent or descent will cease by the time the craft reaches the altitude for which it is set instead of afterwards. By this means, any tendency of the airplane to hunt is prevented and uniform altitude maintained. The same but reverse action takes place when the craft is descending, the joint at this time being broken in the opposite direction.

In this form, also, I have shown the knob 56', which throws the barometric control in and out of operation, as secured to a shaft 84 extending transversely through the control block 33'. Said shaft is shown as threaded therein at 85 and as having transverse bores 86, 86' therein which, when the barometric control is in operation, align with the bores 87, 87' leading to the slots 62, 62' and connected through the pipes 32 and 32' to the nozzles 30 and 31 on the gyroscope. The valve stem also is shown as made at its lower end in the form of a needle valve 88 which normally closes a passage 89 between the interior of the barometric device and the atmosphere within casing 59'. When, however, the valve is turned to open said passage so as to set the device for a different altitude, as shown in Fig. 7, the channels 87 and 87' are closed so that the device cannot be used to control altitude at this time. It is also obvious that the valve 88 may be cracked slightly, if desired, instead of being tightly closed, while at the same time leaving the servo motors in operation so that the valve will act as a very restricted opening to the barometer, whereby the barometric means will behave as a rate of climb device, as outlined in my copending Patent #2,091,306, dated August 31, 1937, for Level flight control for automatic pilots.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described my invention, what I claim and desire to secure by Letters Patent is:

1. In an elevation control for aircraft automatic pilots, the combination with servo means for operating the elevator, of a barometric device, and a control device operated therefrom for controlling said servo means, said control device including a jointed member moved by the barometer, stops for limiting the movement of one end thereof in each direction, and a pick-off device actuated by said member.

2. In a control device for aircraft, the combination with an artificial horizon for controlling the elevator, of a flexible container closed to the atmosphere at will, a shutter connected to the movable side of said container so as to be moved as said container expands and contracts, an air port on each side of said shutter but out of contact therewith, a pair of oppositely acting air motors, one connected to each port, both motors being under the same negative pressure, whereby said motors are differentially driven in accordance with the coverage of said ports, controls at the horizon, the relative position of which is altered by said motors, and a single valve for opening said container and cutting off said ports from said motors in one operation.

3. In an automatic pilot for aircraft, barometric means of the aneroid type for maintaining a predetermined flight level, an arm pivoted adjacent the movable wall of said means, a thermostatic strip secured adjacent one end to said arm and having its other end resting on said wall, and means controlled by the movement of said arm in one direction or the other for causing ascent or descent of the craft.

4. In an automatic pilot for aircraft, barometric means of the aneroid type for maintaining a predetermined flight level, a shutter pivoted adjacent the movable wall of said means, a thermostatic strip clamped adjacent one end to said shutter and having its other end resting on said wall, and differential air ports on each side of the normal position of the shutter for controlling the ascent and descent of the craft.

5. In an automatic pilot for aircraft, barometric means of the aneroid type for maintaining a predetermined flight level, an arm pivoted adjacent the movable wall of said means, a thermostatic strip secured adjacent one end of said arm and having its other end resting on said wall, a centralizing spring bearing at one end against said arm, a movable abutment for the other end of said spring, means controlled by the movement of said arm in one direction or the other for causing ascent or descent of the craft, and a follow back connection from said means for varying the position of said abutment.

6. In a barometric control device for airplane automatic pilots, a fixed member having three channels therein opening on the same side of said member, an aneroid barometric bellows having the interior thereof connected to one channel, a reversible servo motor connected to the other two channels, a plate overlying all of said openings and having a pair of ports normally registering with the channel openings connected to said servo motor, and also having a port normally out of alignment with the barometric channel, and manual means for shifting said plate, whereby said last named port is brought into alignment with its channel and the barometer opened to the atmosphere when the servo motor is shut off.

7. An elevation control for aircraft automatic pilots as claimed in claim 1, wherein the two parts of said jointed member have a slip friction connection whereby said member is returned to its shut-off position with respect to said device with less return than outward movement of said device.

BERT G. CARLSON.